June 30, 1936. S. T. HOYT ET AL 2,045,856
METHOD OF EXTRACTING JUICE FROM PINEAPPLE MEAT
Filed Aug. 7, 1933    5 Sheets-Sheet 1
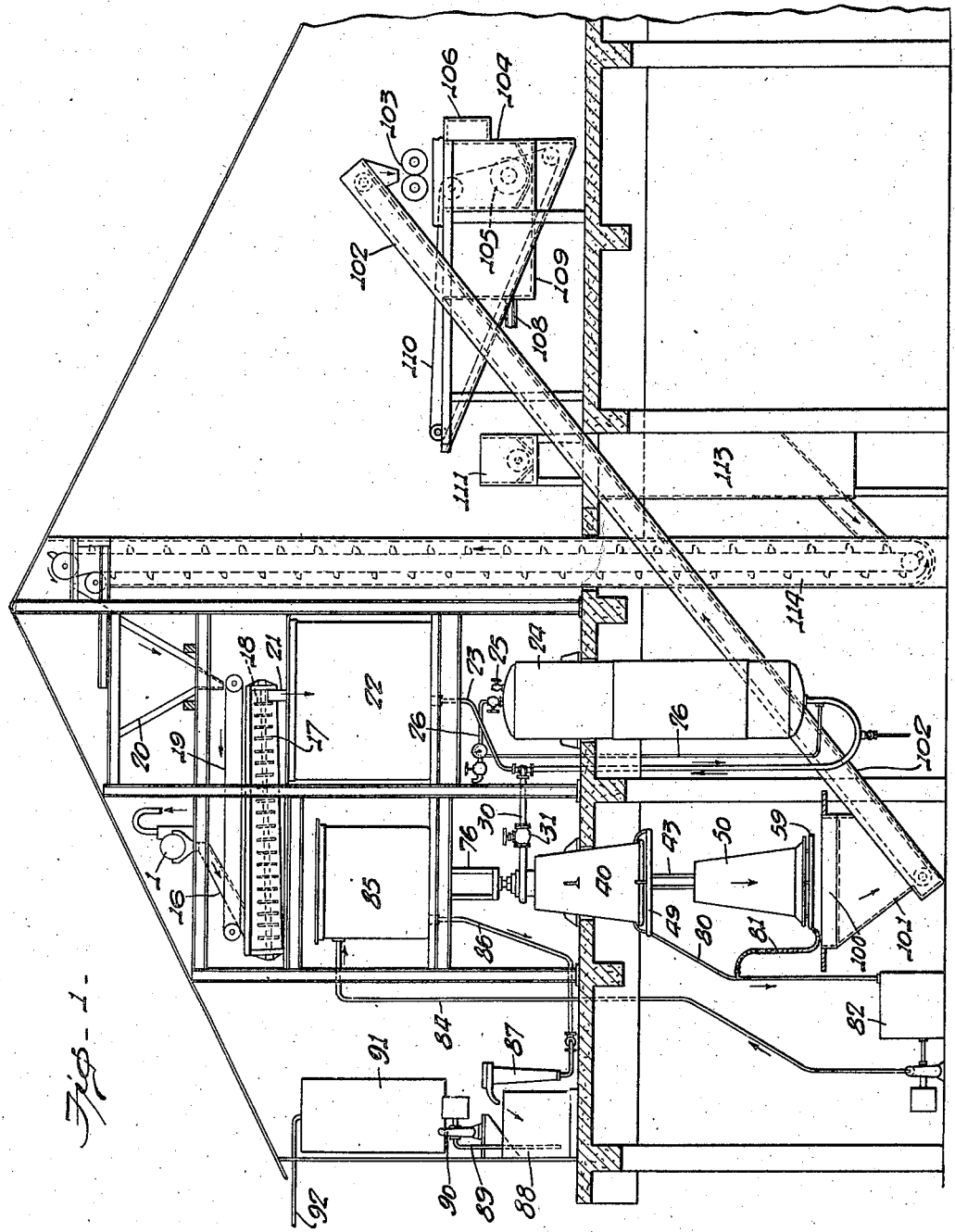
INVENTORS
SIMES T. HOYT
BY RICHARD M. BOTLEY
Ritter, Mechlin & O'Neill
ATTORNEYS

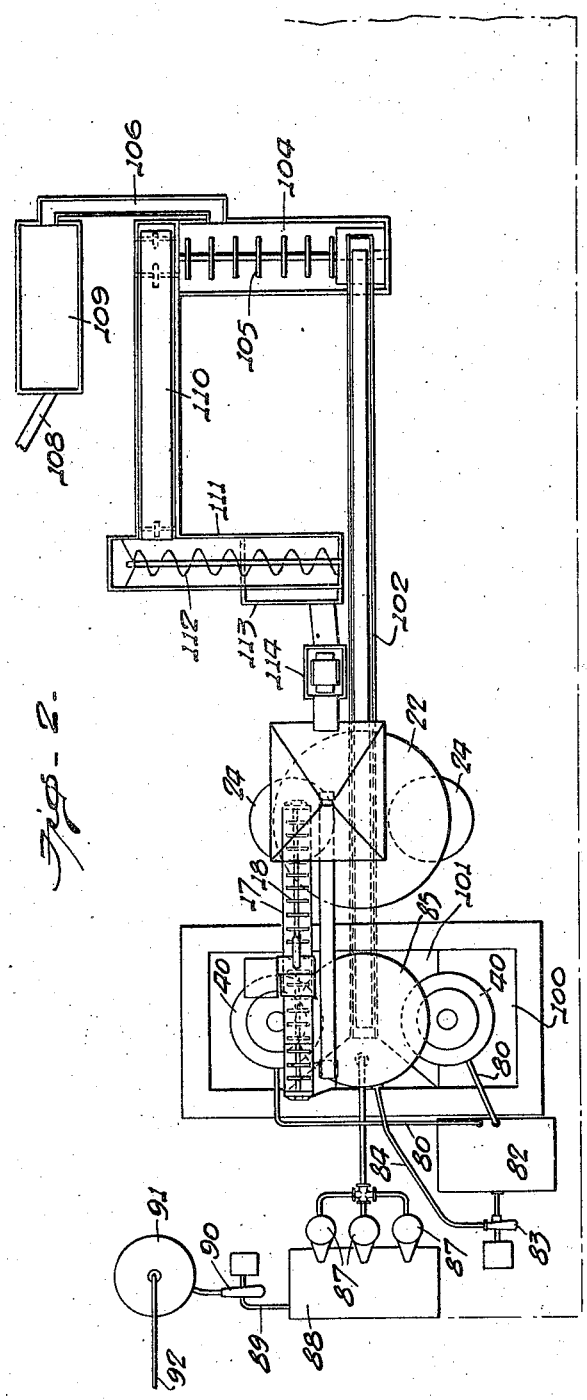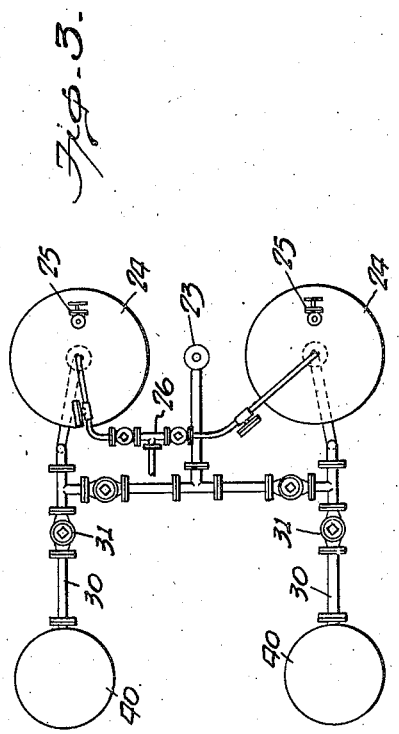

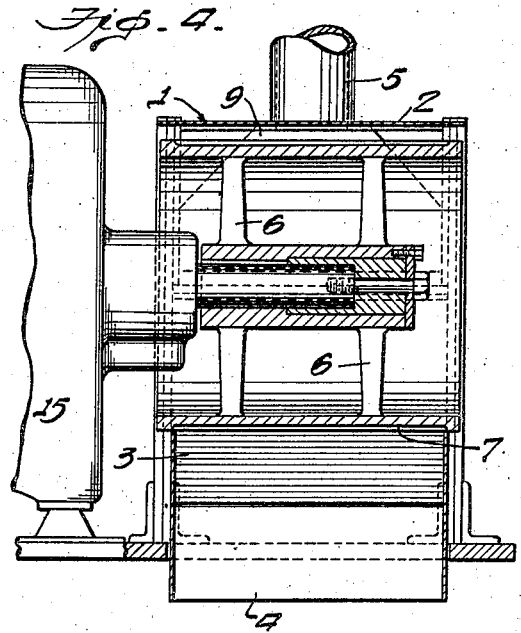
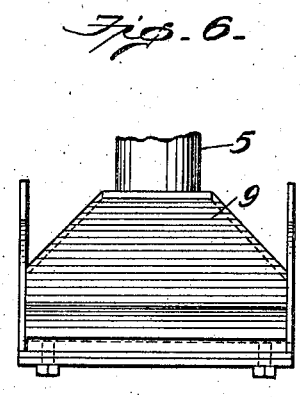
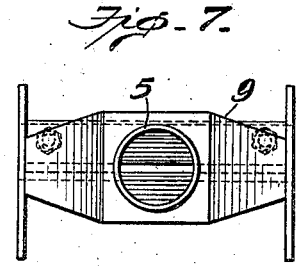
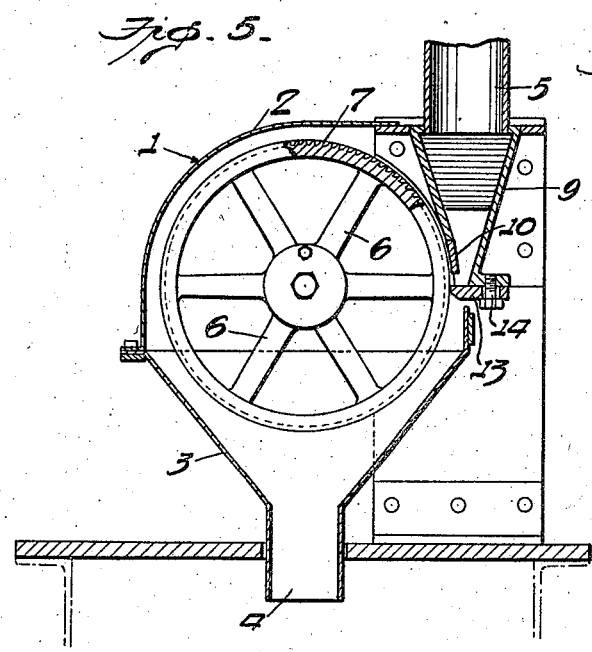
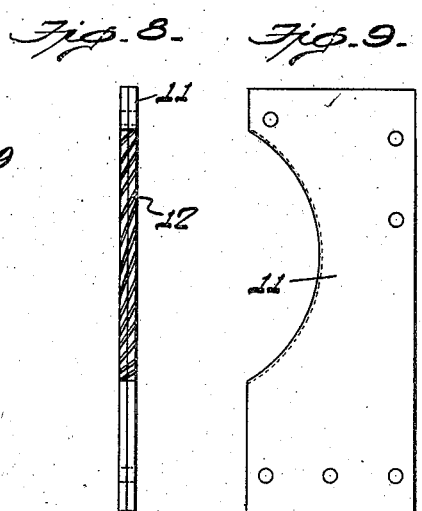

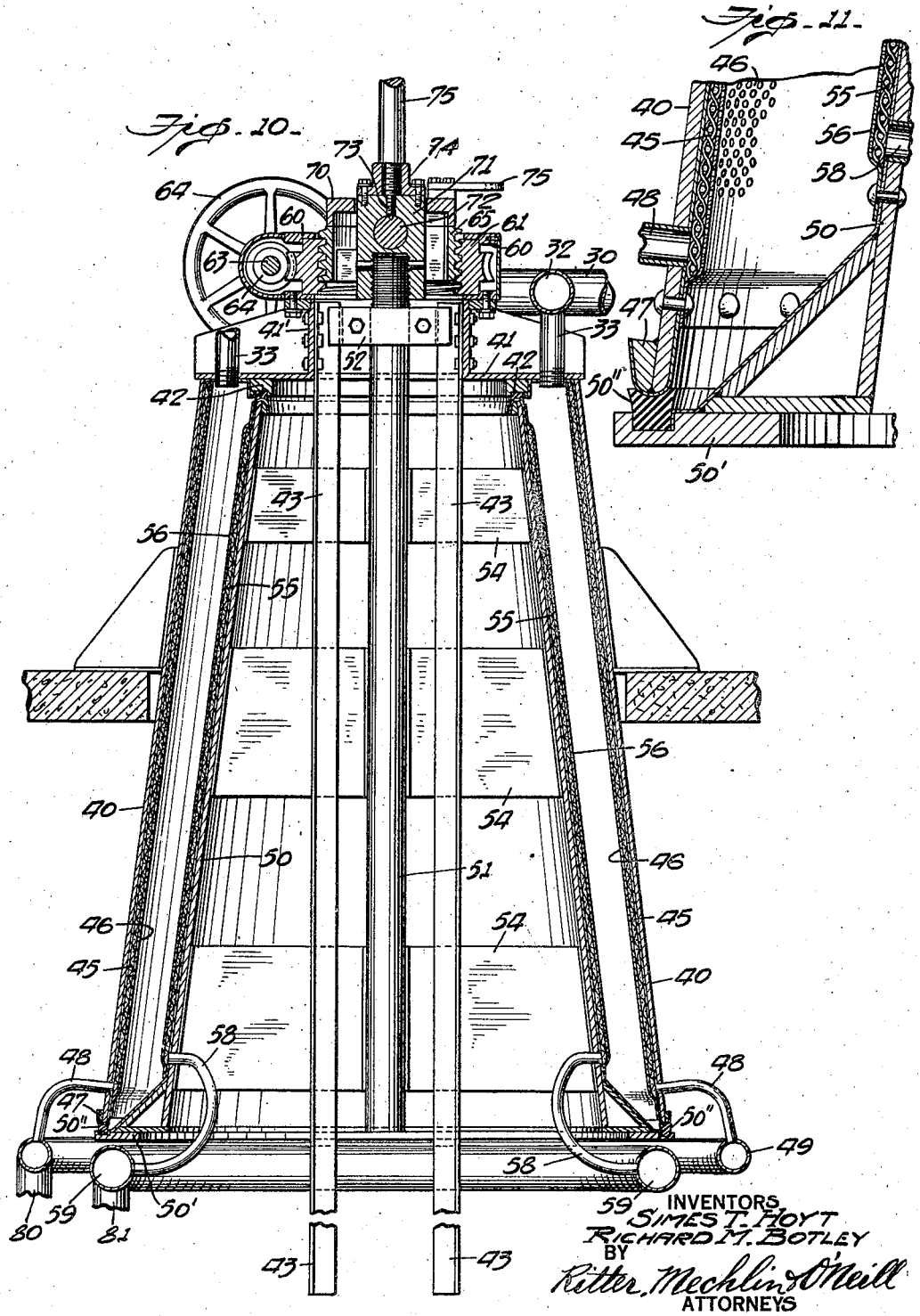

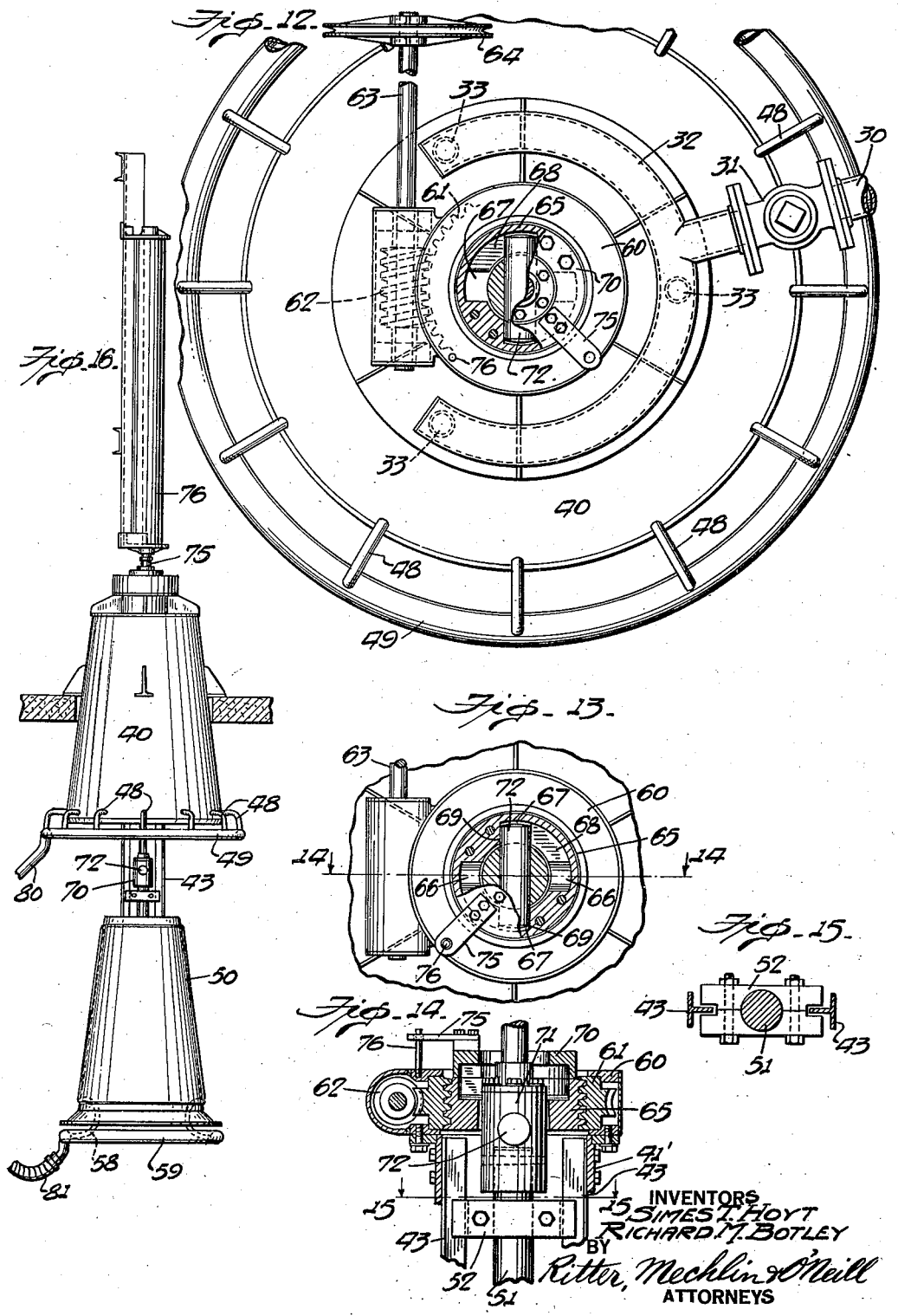

Patented June 30, 1936

2,045,856

UNITED STATES PATENT OFFICE 2,045,856

METHOD OF EXTRACTING JUICE FROM PINEAPPLE MEAT

Simes T. Hoyt and Richard M. Botley, Honolulu, Territory of Hawaii, assignors to Hawaiian Pineapple Company, Limited, Honolulu, Territory of Hawaii, a corporation of Hawaii Application August 7, 1933, Serial No. 684,104

13 Claims. (Cl. 210—186)

This invention relates to a novel method of extracting juice from the meat or flesh of pineapples and has for its object the recovery of a very large percentage of the liquid constituents of the meat or flesh of the fruit uncontaminated either as to appearance or flavor by the presence of solid matter, more especially the shell or rind; to which end the invention includes the separation of the meat or flesh, generally designated as the "pulp", from the shell or rind, reducing the meat by comminution or shredding to a state of substantial fluidity, mixing the same with an inert granular material and separating the juice from the mixture by straining, preferably under pressure.

Means for practicing the invention are illustrated in the accompanying drawings, in which:—

Fig. 1 is a diagrammatic elevation of a plant or system for extracting the juice from the meat of pineapples, for defecating the juice and for recovering the granular material employed as an essential element in separating the liquid constituents of the meat.

Fig. 2 is a plan view of the apparatus illustrated in Fig. 1.

Fig. 3 is a plan view, on a somewhat larger scale, of a portion of the plant, including the dual pressure tanks and strainers.

Fig. 4 is a sectional elevation of a comminuting or shredding apparatus.

Fig. 5 is an end elevation thereof.

Fig. 6 is a front elevation of the upper portion of the device.

Fig. 7 is a plan view thereof.

Figs. 8 and 9 are details of the side plates of the shredder.

Fig. 10 is a sectional elevation, on an enlarged scale, of one of the strainer units.

Fig. 11 is a fragmentary section of Fig. 10, on a larger scale, to show the arrangement of the parts.

Fig. 12 is a plan view, partly in section, of one of the strainer units.

Fig. 13 is a fragmentary plan view showing the strainer elements in unlocked relation.

Fig. 14 is a section on line 14—14 of Fig. 13.

Fig. 15 is a section on line 15—15 of Fig. 14.

Fig. 16 is a fragmentary elevation showing one of the strainer units in separated relation.

In recent years there has been an increasing demand for pure pineapple juice, which is the liquid constituent of the meat or flesh of the fruit, as distinguished from juice obtained from pineapple waste comprising the rind or shell, which injuriously affects the purity and flavor of the juice, and unfits it for use as a beverage or for similar use.

It has been found practically impossible to extract more than twenty or thirty percent of the pure juice by the methods heretofore in vogue, and such a small recovery has greatly impeded the commercial production and dissemination of pure pineapple juice. Heretofore it has been the practice to effect extraction of pineapple juice by subjecting the entire mass of pineapple waste, including the rind or shell, to shredding and pressure operations of various characters, which gave a good recovery of the juice, but which resulted in the juice possessing unpleasant flavor, due to the presence in the mass of the shell or rind, so that such juice could not be used as a beverage or for other similar purposes for which pure pineapple juice is used. All previous attempts to extract the juice merely from the flesh or meat of the pineapple have proven impracticable because of the small recovery of juice obtainable, apparently due to the peculiar characteristics of pineapple flesh or meat, which make it impossible to handle the flesh or meat as in the usual juice extraction methods. Accordingly, heretofore, the operators of canneries have not undertaken to extract the pure juice from pineapple flesh or meat, but such pure juice as has been produced was that which was merely incidental to the preparing and handling of the pineapple in the operation of canning, and the only juice which could be extracted with a sufficiently high percentage of recovery to make it commercially practicable, was the juice contaminated as to flavor, due to the presence of the outer shell or rind during the juice extracting operation.

As heretofore stated, the present invention is designed to effect recovery of the juice from clear flesh or meat of the pineapple in amounts far in excess of amounts heretofore obtained from the meat alone, so that the extraction of the pure juice, uncontaminated by any substance or material of the shell or rind, passes at once from the category of commercially impractical attempts involving the recovery of small percentages of the juice, to a thoroughly practical commercial recovery of substantially all of the juice in the pure meat or flesh.

A comparison of the treatment of the waste under the old practice and the present invention will clearly indicate the commercial importance of the latter. Extensive tests have indicated that the amount of the hard, horn-like covering of pineapples is usually in the neighborhood of ten percent by weight of the whole fruit. Normal pineapple cannery practice is to reject approximately fifty percent of the entire weight of the fruit as being unsuitable for canning. Since the weight of the waste is substantially half that of the whole fruit, it is apparent that the waste will contain twenty percent more or less of the rind or shell, so that an analysis of the waste will show a hard outer shell or rind twenty percent and pulp eighty percent. Assuming that the meat or pulp contains four percent fibre and ninety-six percent juice having a total soluble content of fifteen percent, which is a fair approximation of average conditions, the moisture determination made in the conventional way on the pulp alone would show a moisture content about eighty-one and six-tenths percent. Due to the presence of the hard outer shell or covering, however, a moisture content of a sample of the whole waste will be at some point between this value and the moisture content of the outside portion alone, which might be in the neighborhood of seventy percent. However, the recovery of juice will be based substantially on the liquid content of the pulp alone. The solid material, therefore, in the waste is represented by the shell twenty percent and the fibre in the pulp or meat four percent, or a total of twenty-four percent, so that a maximum possible juice extraction would be seventy-six percent.

If, as is readily obtainable in practice, there is an actual juice extraction of seventy percent, there has been removed approximately ninety-one percent of the total available juice from the waste. This juice, as hereinbefore noted, will have taken on a very distinct and somewhat unpleasant taste, due to the presence of the hard outer shell material, and it is because of this latter condition that this juice is wholly unsuited for beverage purposes, or other similar purposes for which pure pineapple juice is used, but is only of value as a basis for a canning syrup after it has been refined, when it becomes practically a sugar syrup, and no longer has the full pineapple flavor. If, on the other hand, the meat or flesh of the fruit is completely separated from the outer shell or rind, the juice obtained therefrom is pure, entirely suitable for human consumption, and adapted for the various purposes to which pineapple juice is put. But, as stated, when this completely separated flesh is treated in any of the conventional ways heretofore employed for extracting juices from fruit, it is found that, because of the peculiar characteristics of the pineapple flesh, it is impossible to extract the juice therefrom in any amount commercially worth while. The problem which applicants have solved is the recovery of a very high percentage of pure juice from the clear meat or flesh, the juice extraction being as high as ninety-three percent, which is comparable, in all respects, to the percentage of recovery of juice from pineapple waste, but with the very important distinction that the juice extracted by the present method is pure and uncontaminated by any of the elements of the hard outer shell or covering.

In its commercial aspects, the invention is applicable to the treatment of the separated meat portion of pineapple waste for the recovery of pure pineapple juice therefrom, and it is equally applicable to the treatment of the entire meat or flesh of pineapples. The fundamental or primary step in the extraction of the pure juice is the separation of the flesh or meat, otherwise the fruit pulp, from the shell or rind, which is followed by the shredding or comminution of the separated flesh or meat until the latter assumes a highly fluent pulp-like condition which admits of its being readily and thoroughly admixed with a granular inert material, such as clean quartz sand, or the like, to produce a fluent mixture of gritty character, and the mixture subjected to a straining operation, preferably under pressure, with the result that an extremely high recovery or extraction of the pure juice, amounting to as much as ninety-three percent of the total available juice, is obtained.

It is to be understood that the apparatus illustrated as employed for carrying out the method, is largely exemplary and may be varied or changed at will, without departing from the fundamental concept of the means for effecting the desired result.

Referring to the drawings, I indicates a shredding or comminuting device which is of a character to reduce the meat or flesh of the pineapple to the stated condition of substantial fluidity, so that substantially none of the juice cells escape rupture. Pure meat or flesh is fed to the shredder by way of an inlet pipe 5 under sufficient pressure to insure a regular and substantially uniform feed of the meat to the shredder. This meat may be that trimmed from the shells or rinds of pineapples, after the latter have been sized and cored for the usual canning operations by means of a machine, such as exemplified in the patent to Stanley No. 1,430,124, which may be modified, however, to effect a closer trimming of the meat from the shell than contemplated by the normal operation of the Stanley machine, which latter, of necessity, limits the extent of trimming to the portions of the fruit lying wholly inside of the ends of the eyes of the fruit. In the present case, the trimming machine may be adjusted to cut the meat from the interior of the shells practically flush with the inner surface of the latter, as the presence of the eyes in the meat does not affect the juice in any way and the severed eyes may be as readily separated from the juice as the fibrous material of the meat itself.

The comminuting or shredding device is of a known type and differs from standard machines for similar purposes only in the degree of fineness with which the shredding or comminuting is effected. The apparatus involves a casing 2 in which is journaled a drum 6 having its surface provided with teeth 7, except for the extreme ends of the cylindrical surface which are smooth and adapted to closely engage end plates 11 provided with special grooves 12, which prevent the escape of juice past the ends of the drum and serve to direct the juice toward the discharge end of the casing represented by the hopper-like bottom 3, which terminates in a discharge spout 4. The meat fed in by way of the pipe 5 is delivered to a downwardly constricted hopper-like portion 9 and is fed to the periphery of the drum through a slot formed by abutment 10, which is in close proximity to the outer surfaces of the teeth or serrations 7, and an adjustable blade 13 connected to the bottom of the hopper-like portion 9 by means of set screws 14. The drum 6 is driven at a relatively high rate of speed by an electric motor 15. This element of the apparatus is designed to reduce the pineapple meat, whether the same be in the form of crushed pineapple, damaged slices, or any other form of pure meat or fruit pulp to a state of comminution, such that the product passing from the shredder is a highly fluent pulp-like mass, from which it would be utterly impossible to extract any very large proportion of the liquid content by any of the usual filtering or separating operations.

From the shredder 1, the material is delivered by a chute 16 into a trough-like element 17, which is particularly designed to effect an intimate mixture of the substantially liquid mass delivered by the shredder, with a certain proportion of granular inert material, such as quartz sand, or like crystalloid material, contained in hopper 20, and delivered therefrom in predetermined quantities to the trough 17 by means of a belt conveyor 19, which may be operated at any desired speed to effect the delivery of a proper portion of the inert granular material to the mixing trough. Disposed longitudinally in the trough 17 is a shaft carrying mixing blades 18, said shaft being rotated to cause the blades to effect a substantially uniform admixture of the inert granular material and the liquid pulp and to advance the mixture toward a discharge 21 at one end of the trough, which opens into a storage tank 22, which latter may, if desired, be provided with the usual agitating means to maintain a uniform admixture of the granular material in the liquid pulp.

The tank 22 is connected with a pair of pressure tanks 24 adapted to receive a charge of the admixture of liquid pulp and granular material sufficient for the single cycle of operations. The purpose of the dual arrangement of pressure tanks and associated straining apparatus is to admit of the extraction being effected substantially continuously by operating the pressure tanks and strainers sequentially. The pressure tanks are preferred because the gritty character of the admixture makes the same difficult to handle with ordinary pumps, but it will be understood that a pump or pumps may be employed in lieu of the pressure tank, if desired.

The mixture from tank 22 is delivered by pipe 23 to the bottom of each pressure tank 24 and, as stated, a sufficient quantity of the mixture is supplied to the tank to provide a complete charge for the associated separator or strainer. As indicated, each tank 24 is connected by a branch 30 of the supply pipe 23 to a manifold 32 connected to the upper end of a special type of pressure separator or strainer, the pipe 30 being provided with a valve 31. Each of the pressure tanks is provided with a vent valve 25 and is connected with a source of air under pressure, which is delivered to the top of the tank by means of a valved pipe 26, so that the necessary air pressure may be delivered to the top of each of the tanks to impose the necessary pressure on the admixture of the fluid pulp and inert granular material delivered to the strainers, which pressure should be between eighty and one hundred pounds per square inch to effect the best results.

The extractors or strainers are illustrated in detail in Figs. 10 to 15 and are of a construction calculated to effect a rapid extraction of the juice from the mixture and which will withstand the heavy pressure required without impairment of the parts. The specific design of the strainers also renders them particularly adaptable to the removal of the accumulated solid material separated from the juice after each straining operation has been completed.

Each strainer unit comprises an outer frusto-conical shell 40, which is stationary, and a reinforced annular top 41 provided with an annular packing 42 on its under face. Secured to flange 41' surrounding the opening in the top of the outer strainer element are T iron rails 43, 43, which serve as guides for the inner strainer section to be described hereinafter. The inner wall of the shell 40 is provided with a suitable non-corrosive coating and overlying this wall is a covering of mesh fabric 45 which serves as a support for a perforated screen 46, which latter is connected to the walls of the section 40, as shown in detail in Figs. 10 and 11, and constitutes the strainer proper, the perforations therein preferably being approximately one-fiftieth of an inch in diameter and there being approximately five hundred and twenty-nine of said holes in each square inch of surface of the screen. This type of screen has been found quite satisfactory with the pineapple meat shredded to the degree hereinbefore indicated and admixed with sharp sand or other inert granular material, which has been graded, so that the particles will pass through a screen having eight meshes per linear inch, but will be held on a screen having twenty meshes per linear inch. Of course, it will be understood that these figures, both in respect of the perforations in the screen and the gradations of the inert material, are merely exemplary and are susceptible of reasonable variations without departing from the invention. The space between the perforated screen 46 and the inner wall of the shell 40 is connected at its bottom by a series of discharge pipes 48, which, in turn, are connected with a circular pipe or manifold 49, which receives all that portion of the extracted juice which passes through the strainer section 46.

Cooperating with the outer shell 40 is an inner shell 50, the outer surface of which is covered with a mesh screen 55, which, in turn, is overlaid with a perforated plate 56 similar in character to the strainer plate 46 carried by the outer shell. The inner shell is supported on a central rod 51 by radially disposed plates 54 connected to the inner wall of the shell 50 and the rod 51, respectively. The rod 51 is provided near its upper end with a slide 52, clamped thereto and engaging the rails 43, thereby guiding the inner shell or strainer element in its movements into and out of registry with the outer shell. The upper end of the shell 50 is reinforced to form an effective seal with the packing ring 42 carried by the top plate of the outer screen section. The lower portion of the annular space between the screen plate 56 and the outer wall of the inner shell 50 is connected by a series of pipes 58 with a manifold 59, which latter receives the extracted juice passing through the strainer plate 56. The lower portion of the shell 50 is provided with a lateral flange 50' carrying an annular gasket 50", which is engaged by the lower edge of the outer shell 40. It will be seen that this construction and arrangement of the inner and outer shells provides an annular space between the same into which the mixture from the corresponding pressure tank 24 is delivered. As shown in Figs. 10 and 12, the pipe 30, which connects the strainer with its pressure tank, is provided with an arcuate pipe or manifold 32, which is connected at intervals with the top of the shell 40 by pipes 33.

The manifolds 49 and 59 of each strainer mechanism are connected to common discharge pipes 80, which deliver the extracted juice to a tank 82, from which it is forced by a pump 82' to an elevated storage tank 85 by way of pipes 84. From the storage tank 85, the juice is delivered to a battery of centrifugal machines 87, which serve to separate any residual solid matter from the juice and deliver the clarified juice to tank 88, whence it is forced by pump 90 and piping 89 to a heater 91, which raises the temperature of the juice sufficient to sterilize the latter and from which heater the juice is delivered by piping 92 to the packaging plant or section.

In order to remove the accumulation of solid material, which collects in the space between the inner and outer shells of the straining apparatus, the inner shell is adapted to be moved into and out of registry with the outer shell, this movement being effected by means of a suitable air hoist 76, the piston rod 75 of which is connected to the central supporting rod 51 of the inner shell 50, through a special apparatus which effects the making and breaking of the seals between the gaskets 42 and 50'' and coacting peripheral edges of the shells 40 and 50, respectively. The upper end of the rod 51 is screwed into a socket in the lower end of a cylindrical hub-like element 71, the upper face of which is attached to socket 74, into which the end of the piston rod 75 of the air hoist is threaded. The hub 71 is provided with a transverse perforation in which is fitted a cross pin 72, which is locked in position by a set screw 73. Secured to the top 41 of the outer shell 40 is a housing 60, in which is mounted an annular worm gear 61, which is adapted to be rotated by means of a worm 62 mounted on shaft 63 provided with an operating wheel 64. The interior of the worm gear 61 is provided with screw threads which engage the exterior threads of a locking nut 65, which latter is provided with two depressed portions 66 adapted to receive the ends of the cross pin 72 and two slots 67 at right angles to the seats or depressions 66 and which serve to permit the passage of the cross pin 72, when the inner strainer shell 50 is to be moved into or out of registry with the outer shell 40. Between each of the pin seats 66 and one end of the slot 67 is a flat surface 68, and on the opposite side of each pin seat is a stop or abutment 69, which limits the rotary movement of the lock nut to 90°. Secured to the upper face of the lock nut 65 is a perforated plate or cap 70, the purpose of which is to engage the ends of the pin 72 and force the latter and the cone or shell 50 downward during the unlocking movement a distance sufficient to break the seals between the inner and outer shells 40 and 50. Obviously, the inner shell 50 may be reciprocated axially of the outer shell 40 only when the pin 72 is in alignment with the slots 67 carried by the lock nut 65, as indicated in Figs. 13 and 14. As indicated in Fig. 10, the locking nut 65 is in its upper position and the two strainer shells are engaged and locked in operative relation, the ends of the pin 72 occupying the pin seat 66 in the lock nut, thereby maintaining the seal between the gaskets 42 and 50'' and the corresponding peripheral edges of the strainer shells.

When it is desired to remove the accumulated solid material from the strainer by dropping the inner shell 50 to the relative position shown in Fig. 16, the hand wheel 64 is operated to drive the worm gear 61 in a direction to move the locking nut 65 downward, the first part of the movement causing the ends of the pin 72 to ride on the surfaces 68 and the inner surface of the top plate or gear 70 engaging the ends of the pin 72 forces the latter downward, thereby breaking the seal between the inner and outer strainer shells. When the locking nut 65 has completed a quarter turn, the ends of the pin 72 come into registry with the cross slot 67 in said locking nut and further movement of the nut is arrested by the shoulders or abutments 69. The air hoist is then operated to lower the inner shell or cone to clearing position, as indicated in Fig. 16, the inner strainer member being accurately guided in its movement by rails 43, as hereinbefore explained, the movement of the inner shell and its support, including the connections between the same and the air hoist, being effected in a right line without any turning movement. In order to return the inner shell to operative engagement with the outer shell, the air hoist is reversed, thereby moving the inner shell upwardly within the outer shell until the pin 72 passes through the slot 70 in the locking nut, after which the hand wheel 64 is operated to cause the worm gear 61 to rotate locking nut 65 in a direction to cause the same to rise, thereby causing a further upward movement of the inner shell to effect the seal between the inner and outer shells, which seal is maintained by the engagement of the ends of the pin 72 with the seats 66 of the lock nut. This locking and unlocking mechanism takes the strain of maintaining the seal between the inner and outer shells off of the air hoist and is quite necessary, in view of the relatively heavy air pressure that is imposed on the material being treated in the strainer units.

In order to prevent accidental displacement of the lock nut by the operation of the hand wheel 64, when the strainer has been adjusted to open or clearing position, there is secured to the cap or top plate 70 an arm 75 provided with an opening near its end, which is adapted to engage a pin 76 mounted in the top of the housing 61, the registry of the pin 76 with the opening in the arm 75 being coincident with the registry of the cross pin 72 with the slot 67 in the lock nut, so that accidental rotation of the lock nut, when the inner strainer shell is in lowered position, is prevented and any movement of the lock nut is prevented until the pin 72 reaches the upper limit of its movement within the lock nut.

Below the straining unit there is located a slatted platform 100, beneath which is a hopper 101. When the caked solid material is broken loose from the lowered inner shell 50, it falls onto the platform where it may be further comminuted and washed into the hopper, whence it is elevated by a suitable conveyer, such as 102, discharged into a shredder or breaking device 103, which further comminutes the broken cake, delivers the same into an apparatus for separating the bulk of the fiber or other solid material derived from the fruit, from the sand or other inert granular material, so that the latter may be put into condition for further use. From the flotation separator 104, which may be of any appropriate construction, the granular material and any residual solids are delivered by a conveyer 110 to a washer 111, which is effective in thoroughly cleansing the sand of foreign material and which delivers the same to a hopper 113, which communicates with the bottom of an endless conveyor 114, which, in turn, delivers the reclaimed sand or other granular material to the storage bin 20, whence it is delivered in properly regulated quantities to the mixer 17, as hereinbefore explained.

It is to be understood that the particular elements of the plant and the specific coordination thereof in carrying out the novel method of separating maximum proportions of pure juice from pineapple meat or flesh, are to be regarded as exemplary only and that they may be changed and modified at will, provided the plant, as a whole, is capable of reducing the pure flesh from the pineapple, in whatever original form the flesh may be, to a condition of substantial fluidity or a highly fluent pulp, of admixing with the latter from ten percent to thirty percent of its weight of an inert granular material, such as clean sharp sand, delivering the mixture to straining apparatus preferably operated under pressure to effect the separation of the juice from the mixture, so that the juice may be recovered in substantial purity, without contamination, with the exception of some residual solid material which may be readily separated by centrifugal or other devices.

The above percentage figures are based upon the use of a material having a specific gravity of approximately 2½ times that of water.

It should be understood that materials having specific gravities other than that specified may be employed, in which case the percentages by weight must be modified correspondingly. It must be further understood that the required percentage of inert granular material is largely dependent upon the physical characteristics of the particles employed, and that the percentage figures above stated represent an optimum for commercially satisfactory juice extraction for materials which are ordinarily commercially available at low cost. The use of slightly smaller or considerably greater quantities will often give satisfactory results.

What we claim is:

1. The method of extracting juice from the meat of pineapples, which comprises separating the meat from the shell, shredding the meat to the consistency of a fluent pulp, thereafter suspending in the pulp impervious, non-absorbent particles of an inert granular material, and separating the juice from the mixture by straining.

2. The method of extracting juice from the meat of pineapples, which comprises separating the meat from the shell, shredding the meat to the consistency of a fluent pulp, mixing the pulp with non-absorbent particles of a sharp inert granular material substantially of a particle size to be retained on a screen having 50 meshes to the linear inch, and separating the juice from the mixture by straining under pressure.

3. The method of extracting juice from the meat of pineapples, which comprises separating the meat from the shell, reducing the meat by comminution to a state of substantial fluidity, mixing with the fluent mass coarse, sharp particles of granular material predominantly of a particle size which will be retained on a screen having 20 meshes to the linear inch, and separating the juice from the mixture by straining.

4. The method of extracting juice from the meat of pineapples, which comprises separating the meat from the shell, reducing the meat by comminution to a state of substantial fluidity, thereafter suspending non-absorbent sharp particles of granular material in the fluent mass, and separating the juice from the mixture by straining under pressure.

5. The method of extracting juice from the meat of pineapples, which comprises separating the meat from the shell, reducing the meat by comminution to a state of substantial fluidity, thereafter mixing with the fluent mass a quantity of granular material equal to ten percent to thirty percent of the weight of said fluent mass, and separating the juice from the mixture by straining.

6. The method of extracting juice from the meat of pineapples, which comprises separating the meat from the shell, reducing the meat to a state of substantial fluidity, mixing the fluent mass with granular material which is substantially of a particle size to be retained on a screen having 50 meshes to the linear inch, and separating the juice from the mixture by straining under pressure.

7. The method of extracting juice from the meat of pineapples which comprises separating the meat from the shell, reducing the meat by comminution to a state of substantial fluidity, mixing with the fluent mass an inert granular material the particles of which are preponderantly of a size to pass through a screen having eight meshes per linear inch but be retained on a screen having twenty meshes per linear inch, and separating the juice from the mixture by straining.

8. The method of extracting potable juice from pineapple which comprises separating the meat from the shell, comminuting the meat so that substantially all of the juice cells are ruptured and the mass assumes a state of substantial fluidity, thereafter mixing non-absorbent particles of granular material with the fluent mass and maintaining said granular material in suspension therein while separating the juice from the mixture by straining.

9. The method of extracting liquid from fruit having fibrous juice cells comprising comminuting the fruit to a fluent pulpy mass in which the cells are ruptured, thereafter suspending in said mass non-absorbent particles of granular material, said particles being predominantly of a size to be retained on a screen having 20 meshes per linear inch, and separating the liquid from the mass by straining.

10. The method of extracting liquid from fruit having fibrous juice cells comprising comminuting the fruit to a fluent pulpy mass in which the cells are ruptured, thereafter suspending in said mass non-absorbent particles of granular material, said particles being predominantly of a size to be retained on a screen having 50 meshes per linear inch, and separating the liquid from the mass by straining.

11. The method of extracting pineapple juice substantially uncontaminated either as to appearance or flavor by the presence of solid matter, which comprises separating the meat from the shell, shredding the meat to the consistency of a fluent pulp, thereafter changing said fluent pulp to a fluent mixture of gritty character by mixing therewith inert granular material of a particle size and in an amount to produce said mixture, and separating the juice from said mixture.

12. The method of extracting pineapple juice substantially uncontaminated either as to appearance or flavor by the presence of solid matter, which comprises separating the meat from the shell, shredding the meat to the consistency of a fluent pulp, thereafter changing said fluent pulp to a fluent mixture of gritty character by mixing therewith quartz sand of particle size and in an amount to produce said mixture, and separating the juice from said mixture.

13. The method of extracting liquid from fruit having fibrous juice cells comprising comminuting the fruit to a fluent pulpy mass in which the cells are ruptured, thereafter suspending non-absorbent sharp particles of granular material in the fluent mass and separating the liquid from the mass by straining under pressure.

SIMES T. HOYT.
RICHARD M. BOTLEY.